(12) United States Patent
Hahn

(10) Patent No.: US 7,757,993 B1
(45) Date of Patent: Jul. 20, 2010

(54) METHOD FOR REDUCING THE TURBULENCE AND GUST INFLUENCES ON THE FLYING CHARACTERISTICS OF AIRCRAFT, AND A CONTROL DEVICE FOR THIS PURPOSE

(75) Inventor: Klaus-Uwe Hahn, Wendeburg (DE)

(73) Assignee: Deutsches Zentrum fuer Luft- und Raumfahrt e. V., Cologne (DE)

( * ) Notice: Subject to any disclaimer, the term of this patent is extended or adjusted under 35 U.S.C. 154(b) by 325 days.

(21) Appl. No.: 11/381,192

(22) Filed: May 2, 2006

(30) Foreign Application Priority Data

May 3, 2005 (DE) ................. 10 2005 020 660

(51) Int. Cl.
*G05D 1/08* (2006.01)
*B64C 13/16* (2006.01)
(52) U.S. Cl. ..................... 244/195; 244/76 C
(58) Field of Classification Search ............ 244/177, 244/178, 179, 184, 194, 195, 174, 99.13, 244/76 C; 701/6
See application file for complete search history.

(56) References Cited

U.S. PATENT DOCUMENTS

| | | | | |
|---|---|---|---|---|
| 3,240,447 A | * | 3/1966 | Olshausen | 244/177 |
| 3,654,443 A | * | 4/1972 | Dendy et al. | 701/3 |
| 5,331,558 A | * | 7/1994 | Hossfield et al. | 701/21 |
| 5,375,794 A | * | 12/1994 | Bleeg | 244/195 |
| 5,590,853 A | * | 1/1997 | Greene | 244/184 |
| 5,669,582 A | * | 9/1997 | Bryant et al. | 244/76 C |
| 5,797,105 A | * | 8/1998 | Nakaya et al. | 701/7 |
| 6,273,370 B1 | * | 8/2001 | Colgren | 244/194 |

OTHER PUBLICATIONS

Angle of Incidence, Wikipedia; versions from both Jan. 2, 2004 and Dec. 22, 2008 included; both accessed on Feb. 25, 2009 at http://en.wikipedia.org/wiki/Angle_of_incidence.*
R. O'Connell; Decign, Development and Implementation of an active Control System for Load Alleviation for a Commercial Transport Airplane; North Atlantic Treaty Org. Adv. Group for Aerospace Research and Development; 49th Structures and Materials Panel Meeting; Germany, Oct. 1979. H. Bohret et al.; Olga—an Open Loop Gust Alleviation System.
G. Rollwagen et al; Identification of Dynamic response Simulation and Design of a Hihgly NonLinear Digital Load Alleviation System for a Modern Transport Aircraft; ICAS Proceedings 1990; 17th Congress of International Council of the Aeronautical Sciences; Sep. 1990; Stockholm, Sweden; ICAS-90.1.3.4; pp. I 428-433.
17th Congress of the International Council of the Aeronautical Sciences, Stockholm, Sweden, Sep. 9-14, 1990; vol. 2.
AIAA Atmospheric Flight Mechanics Conference, Part 1; Aug. 10-12, 1992.
Jahrbuch, Sep. 10-13, 1991.

* cited by examiner

*Primary Examiner*—Tien Dinh
*Assistant Examiner*—Richard R Green
(74) *Attorney, Agent, or Firm*—Whitham Curtis Christofferson & Cook, PC

(57) ABSTRACT

A control device for aircraft for reducing the turbulence and gust influences on the flying characteristics is designed to generate an additional incidence angle drive signal for control surfaces on surfaces which generate an air force, in particular wing and/or tailplane as a function of an instantaneous bank angle ($\Phi$) and sideslip angle ($\beta$).

6 Claims, 4 Drawing Sheets

METHOD FOR REDUCING THE TURBULENCE AND GUST INFLUENCES ON THE FLYING CHARACTERISTICS OF AIRCRAFT, AND A CONTROL DEVICE FOR THIS PURPOSE

FIELD OF THE INVENTION

The invention relates to a method for reducing the turbulence and gust influences on the flying characteristics of aircraft, and to a control device for this purpose.

BACKGROUND OF THE INVENTION

The flying characteristics of aircraft, in particular of airplanes, are disadvantageously influenced by turbulence and gusts in the air masses surrounding the aircraft. In particular, a large increase in lift, low wing loadings and high airspeeds as well as low altitudes have negative influences on the turbulence and gust behavior of aircraft. These result in a deterioration to passenger comfort and in an increase in structural loads. However, strong turbulence ("clear air turbulence" CAT) can occur even at high altitudes and can produce considerable structural loads, and can even lead to danger to the aircraft occupants.

A system for reducing gust loads and for damping structural oscillations is described in O'Connel, R. F.: "Design, Development and Implementation of an Active Control System for Load Alleviation for a Commercial Airplane", in: AGARD Report No. 683,1979 and in rolling vehicles, G.; Ellgoth, H.; Beuck, G.: "Identification of Dynamic Response, Simulation and Design of a Highly Nonlinear Digital Load Alleviation System for a Modern Transport Aircraft", in; 17th ICAS Congress, Stockholm, Sweden, based on the principle of signal (feedback closed loop system). However, this control system reacts only after the flying characteristics resulting from turbulence and/or gusts have already notably changed.

A control method based on the principle of application of disturbance variables in order to reduce gust loads and to improve passenger comfort is known from Bohret, H.; Krag, B.; Skudridakis, J.: "OLGA—An Open Loop Gust Alleviation System", in: AGARD CP No. 384, Toronto, Canada, 1985. In this case, the flying characteristics are not changed, with a reaction taking place to the original disturbance itself, and compensating for it before the disturbance caused by turbulence or gusts acts on the aircraft itself.

Comparable control methods are also described in Hahn, K.-U.; König, R.: "LARS—Auslegung eines fortschrittlichen Böenabminderungssystems mit ATTAS", (LARS—design of an advanced gust reduction system using ATTAS), in: Deutscher Luft and Raumfahrtkongress, (German Aviation Space Flight Congress), 1991 and in Hahn, K.-U.; König, R.: "ATTAS Flight Test and Simulation Results of the Advanced Gust Management System LARS", in: AIAA Atmospheric Flight Mechanics Conference, Hilton Head Island, S.C., USA, 1992.

When using the principle of signal feedback (closed loop), the reaction of the aircraft to the gusts is measured and is fed back to the wing control surfaces in order to reduce this reaction. This does not require any complex calculation of the gust angle. However, accelerations results from flight maneuvers are also fed back via the control system and can counteract the pilot commands.

In the case of open-loop control methods, the angle of attack of a gust must be known precisely. This must be determined from sensor signals. The control surfaces of the wings and of the tailplane are adjusted as a function of the gust angles of attack in such a way that additional lift forces and pitch moments caused by the gusts are compensated for. In this case, the handling characteristics of the aircraft remain unchanged. However, the efficiency of the control system is highly dependent on the accuracy of the calculation of the gust angle of attack, and on the degree of deflection of the control surfaces.

The control method based on the principle of application of disturbance variables, in which the so-called wind incidence angle is calculated from air data and inertial data is described in König, R., Hahn, K-U.: "Load Alleviation and Rights Musing Investigations using ATTAS", in: 17th ICAS Congress, Stockholm, Sweden, 1990. The wind incidence angle is the additional incidence angle which changes the lift and results from atmospheric turbulence and gusts. Only the aircraft longitudinal movement is taken into account, in order to avoid complex gust vector determination. The wind incidence angle $\alpha_W$ is calculated using the following formula:

$$\alpha_W = \alpha_L - \theta + \frac{\dot{H}}{V} + \frac{q \cdot r_s}{V}$$

In this case, $\alpha_L$ is the incidence angle measured by an incidence angle sensor (for example aircraft), $\theta$ is the longitudinal attitude angle, also referred to as the pitch angle, $\dot{H}$ is the instantaneous vertical velocity of the aircraft, V is the airspeed of the aircraft with respect to the air, q is the pitch rate of the aircraft and $r_S$ is the distance between the wind attack sensor and the center of gravity of the aircraft.

The stated variables are defined unambiguously in DIN 9300 "Luft- und Raumfahrt; Begriffe, Größen und Formelzeichen der Flugmechanik" (aviation and space flight; terminology, variables and formula symbols for flight mechanics).

The pitch angle is in this case the angle between the aircraft longitudinal axis in the aircraft-fixed coordinates system and the node axis $k_1$ as the projection of the aircraft-fixed aircraft longitudinal axis $x_f$ onto the geodetic horizontal plane, that is to say the $x_g$-$y_g$-plane. The pitch rate q is the angular velocity of the aircraft about the aircraft lateral axis $y_f$.

The described control method is not suitable for adequate turbulence and gust compensation when in turning flight as a result of the simplified consideration of only the aircraft longitudinal movement, particularly when sideslip angles also occur in this case between the lateral axis and the lateral force axis of the aircraft.

SUMMARY OF THE INVENTION

One object of the invention is to provide an improved method for reducing the turbulence and gust influences on the flying characteristics of aircraft, as well as a corresponding control device, in order nevertheless to determine a sufficiently accurate additional incidence angle drive signal without any complex gust vector determination, independently of the flight motion of the aircraft, that is to say even when in turning flight.

The object is achieved by the method and the control device of the type mentioned initially, according to the invention, in that the additional incidence angle drive signal is determined for control surfaces on surfaces which generate an air force, in particular wing and/or tailplane of the aircraft as a function of an instantaneous bank angle and sideslip angle.

The bank angle and the sideslip angle can easily be determined in a known manner by means of sensors, and can be determined from measurement data available in an aircraft for the attitude, position and velocity of the aircraft.

It is particularly advantageous when the formula mentioned initially for calculation of the wind incidence angle is modified in such a way that the component $\alpha_{Wf}$ of the wind incidence angle caused by a vertical air mass movement is determined on the plane of symmetry of the aircraft using the following formula:

$$\alpha_{Wf} = \cos(\phi)\left[f\left(\frac{\dot{H}}{V}\right) - \theta + \cos(\phi)\left(\alpha + \frac{q \cdot r_{A\phi A}}{V}\right) + \sin(\phi)\left(\beta - \frac{r \cdot r_{A_a S}}{V}\right)\right]$$

In this case, $\Phi$ is the bank angle, $\dot{H}$ is the vertical velocity of the aircraft, V is the airspeed of the aircraft with respect to the surrounding air, $\theta$ is the longitudinal attitude angle of the aircraft, $\alpha$ is the incidence angle of the wings of the aircraft, q is the pitch rate of the aircraft, $r_{AoA}$ is the distance between the incidence angle sensor and the center of gravity of the aircraft, r is the yaw rate and $f_{AoS}$ is the distance between the sideslip angle sensor and the center of gravity.

$$f\left(\frac{\dot{H}}{V}\right)$$

is a function of the ratio of the vertical velocity to the airspeed. The bank angle $\Phi$ is used for correct transformation to the aircraft-fixed coordinate system, and the sideslip angle $\beta$, as additional influences.

The stated variables are defined unambiguously in DIN 9300, to which reference is made.

It is particularly advantageous for the determination of the drive signal to be formed using the function $$f\left(\frac{\dot{H}}{V}\right) \text{ equal to } \frac{\dot{H}}{V} \text{ or } \arcsin\left(\frac{\dot{H}}{V}\right)$$

DESCRIPTION OF THE DRAWING FIGURES

The invention will be explained in more detail in the following text using the attached drawings by way of example, in which.

DETAILED DESCRIPTION OF THE INVENTION

Figure 1:
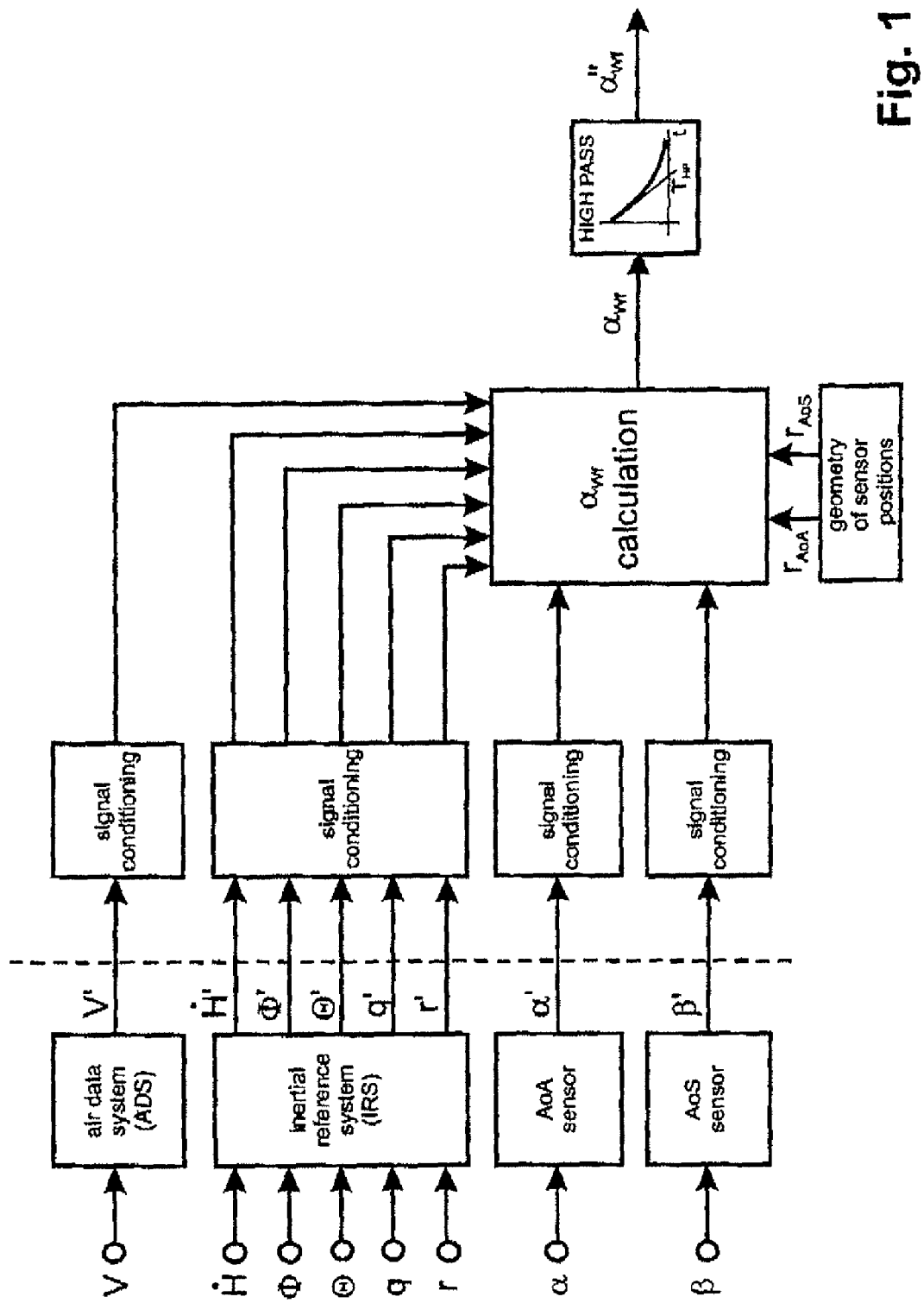
FIG. 1 shows a block diagram of a device for determination of the wind incidence angle.

FIG. 1 shows a block diagram of a control device for determination of the wind incidence angle $\alpha_{Wf}$ in the vehicle-fixed coordinate system which, after high-pass filtering, is used as a drive signal $\alpha_{Wf}^H$ for open-loop control based on the disturbance-variable application principle.

The velocity V of the aircraft with respect to the air is determined by means of an air data system. The geodetic vertical velocity $\dot{H}$ of the aircraft is determined either from the air data system as the barometric altitude change $\dot{H}_{baro}$, from the inertial reference system (IRS) as $\dot{H}_{inertial}$ or with the aid of complementary filtering from the barometric altitude signal $\dot{H}_{baro}$ and the inertial vertical acceleration $\ddot{H}_{inertial}$. Furthermore, the inertial reference system (IRS) is used to detect the bank angle $\Phi$, the longitudinal attitude angle $\theta$, the pitch rate q and the yaw rate r. The incidence angle $\alpha$ is detected by an incidence angle sensor. The sideslip angle $\beta$ is detected by a sideslip angle sensor. All of the sensor signals are conditioned (signal conditioning) at least in such a way that they are calibrated and synchronized.

The component $\alpha_{Wf}$ caused by a vertical air mass movement of the wind incidence angle on the aircraft plane of symmetry is defined in the aircraft-fixed coordinate system using the formula:

$$\alpha_{Wf} = \cos(\phi)\left[f\left(\frac{\dot{H}}{V}\right) - \theta + \cos(\phi)\left(\alpha + \frac{q \cdot r_{A\phi A}}{V}\right) + \sin(\phi)\left(\beta - \frac{r \cdot r_{A_a S}}{V}\right)\right]$$

The factors $\cos(\phi)$ and $\sin(\phi)$ and the sideslip angle $\beta$ are used to correctly determine the wind incidence angle $\alpha_{Wf}$ on the aircraft plane of symmetry resulting from a vertical air mass movement even when the boundary conditions change, for example when turning. The vertical wind component acting on the aircraft plane of symmetry produces the wind incidence angle $\alpha_{Wf}$ which acts as an additional incidence angle on the wing and thus causes a change in lift. It is advantageous to filter the calculated wind incidence angle $\alpha_{Wf}$ by means of a high-pass filter. If necessary, any constant sensor errors, slow sensor drifts and very low-frequency air mass movements (which are not relevant for gust loads) are filtered out in the case of the filtered wind incidence angle $$\alpha\frac{H}{Wf}$$

produced in this way. The effective component $\alpha_{WF}$ can be compensated for, for example, with the aid of control surfaces for direct lift control.

Figure 2:
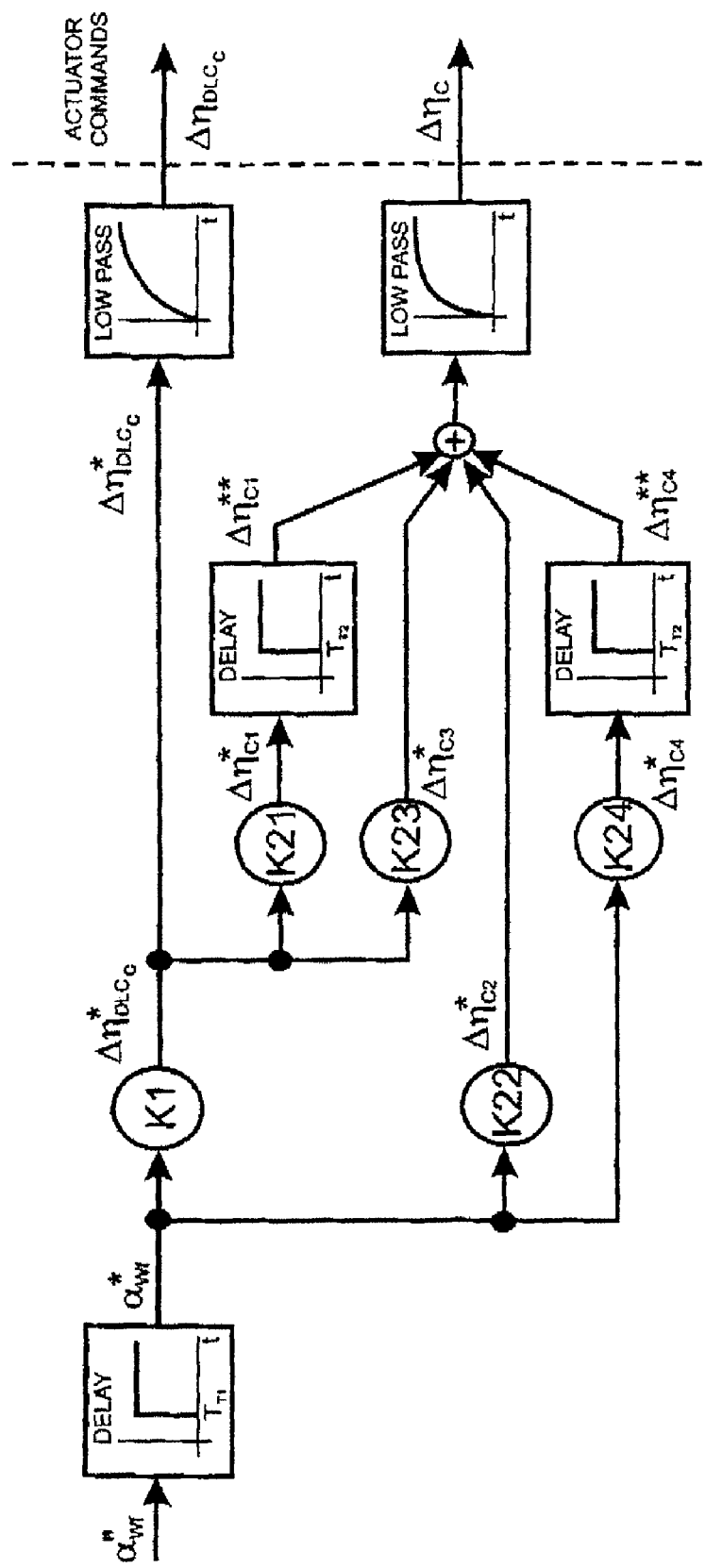
FIG. 2 shows a block diagram of open-loop control of control surfaces on wings and on the tailplane as a function of the wind incidence angle.

FIG. 2 shows a block diagram of an open-loop control system, in which the component $\alpha_{Wf}$ of the wind incidence angle on the aircraft plane of symmetry is applied to the control signals as a disturbance variable in order to control the control surfaces on the wings and on the tailplane (in general the elevator). The control surfaces on the wings are used for direct lift control.

The delay time $T_{T1}$ takes account of the delay time of the gust disturbance from the location of the incidence-angle or sideslip-angle measurement to the lift-generating wing. The wind incidence angle $\alpha H/Wf$ delayed by the delay time $T_{T1}$ is multiplied by the gain factor K1 and, after low-pass filtering, is used as a difference manipulated variable for controlling the control surfaces on the wings.

Different difference control signals, which in some cases are delayed by $T_{T1}$ or $(T_{T1}+T_{T2})$, are supplied to the tailplane control surfaces in order to control the pitch moment budget.

The measurement variables which are used to determine the wind incidence angle $\alpha_{Wf}$ will be explained in more detail in the following text with reference to FIGS. 3 and 4, with reference also being made to DIN 9300.

Figure 3:
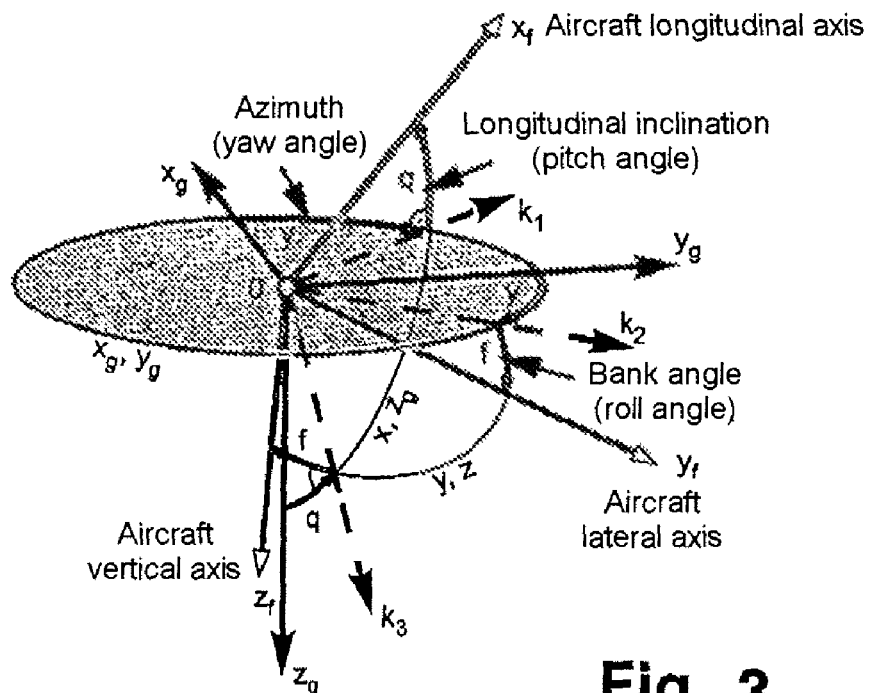
FIG. 3 shows a definition of axes and angles in the geodetic (g) and aircraft-fixed (f) coordinate system in accordance with DIN 9300.

FIG. 3 shows the aircraft-fixed coordinate system with the index "f". The aircraft-fixed coordinate system is defined by the aircraft longitudinal axis $x_f$, the aircraft lateral axis $y_f$ and the aircraft vertical axis $z_f$. Furthermore, a first node axis $k_1$ is defined as the projection of the aircraft longitudinal axis $x_f$ onto the geodetic horizontal plane $x_g$, $y_g$. The longitudinal inclination or the pitch angle is the angle between the aircraft longitudinal axis $x_f$ in the aircraft-fixed coordinate system and the first node axis $k_1$. The pitch angle is at right angles to the horizontal plane $x_g$, $y_g$ between the node axis $k_1$ and the longitudinal axis $x_f$ in the aircraft-fixed coordinate system.

The bank angle or roll angle $\phi$ is defined between a second node axis $k_2$ and the aircraft lateral axis $y_f$ in the aircraft-fixed coordinate system. The second node axis $k_2$ lies in the geodetic horizontal plane $x_g$, $y_g$ and is at right angles to the first node axis $k_1$. The yaw angle, the pitch angle and the roll angle $\phi$ are referred to together as Euler angles. These Euler angles are not at right angles to one another, so that the sequence of the individual rotations in the transformation from the aircraft-fixed coordinate system to an aerodynamic coordinate system and vice versa is important.

Figure 4:
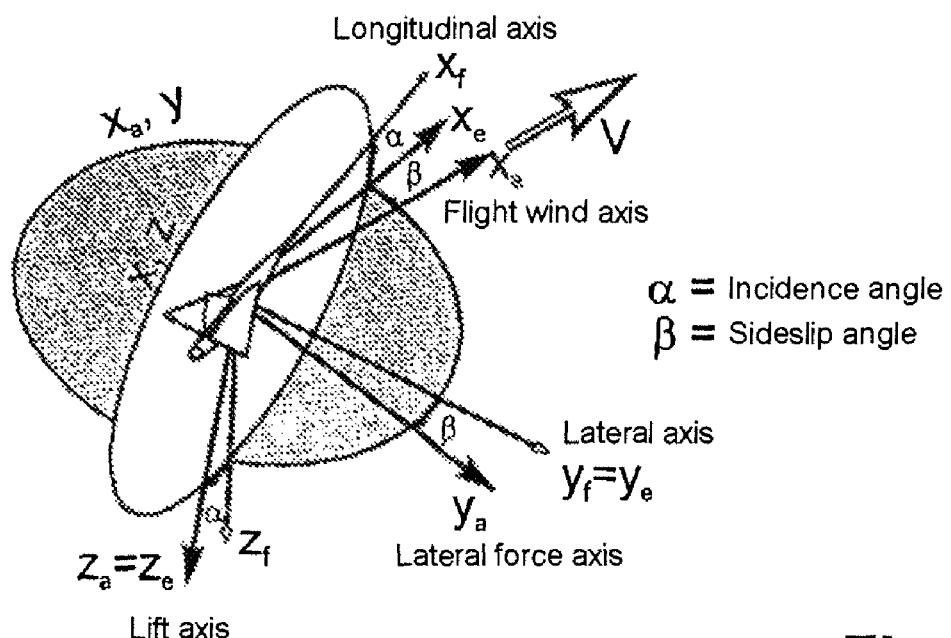
FIG. 4 shows a definition of axes and angles in the aircraft-fixed (f), aerodynamic (a) and experimental (e) coordinate system in accordance with DIN 9300.

FIG. 4 shows the aerodynamic coordinate system $x_a$, $y_a$, $z_a$ with the index "a". An aircraft-fixed coordinate system $x_f$, $y_f$ and $z_f$ is also shown. FIG. 4 also shows the experimental coordinate system (index "e"). The lateral axis of the aircraft $y_f$ and the $y_e$ axis in the experimental coordinate system coincide: $y_f = y_e$. The $z_a$ axis in the aerodynamic coordinate system and the $z_e$ axis in the experimental coordinate system coincide: $z_a = z_e$.

The z axis in the aerodynamic coordinate system forms the lift axis $z_a = z_e$. The y axis in the aerodynamic coordinate system forms the lateral force axis $y_a$.

The sideslip angle $\beta$ is the required rotation angle about the $z_a = z_e$ axis in order to change the $x_e$ axis to the $x_e$ axis to the $x_a$ axis.

The incidence angle $\alpha$ is the required rotation angle about the $y_f = y_e$ axis in order to change the $x_e$ axis to the $x_f$ axis.

V denotes the airspeed vector with respect to the air, which is sketched as an arrow.

Figure 5:
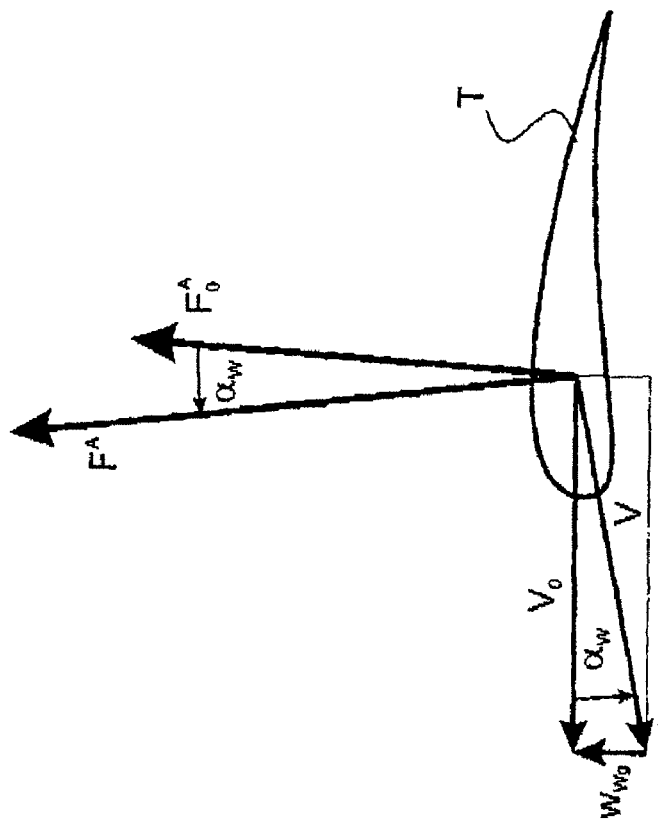
FIG. 5 shows a cross-sectional view of a wing in order to illustrate the change in the air force vector as a consequence of an upward wind gust.
Figure 5:
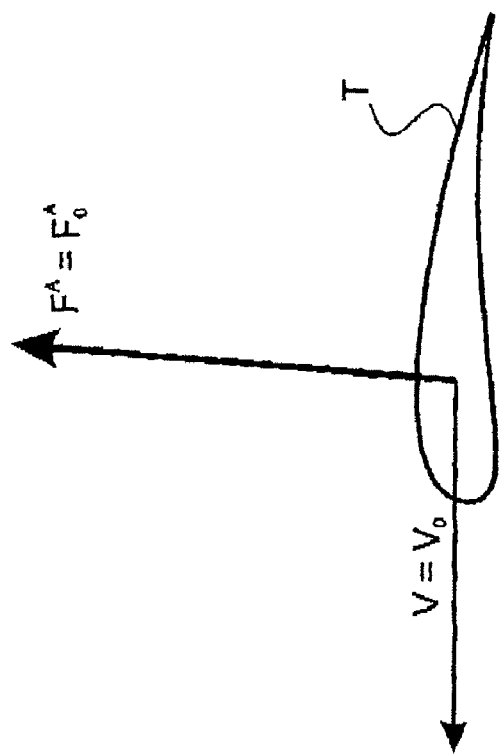

FIG. 5 shows a cross-sectional view of a wing T with an incident flow. The left-hand image shows the relationships during steady-state flight in a steady-state atmosphere. The airspeed $V=V_0$ of the aircraft (V=velocity of the incident flow onto the wing T) generates an air force $F^A = F_0^A$. If an upward wind gust now acts on the wing, the magnitude and direction of the airspeed V change. The magnitude of the airspeed becomes slightly larger ($V>V_0$), and the wing T of the airspeed becomes slightly larger ($V>V_0$) and the flow strikes the wing T from a steeper direction. In comparison to the original incident flow direction of the wing T, the upward wind gust would generate the wind incidence angle (=additional incidence angle) $\alpha_W$. The two effects lead to an increase in the resultant air force $F^A = F_0^A$. The direction of the resultant air force $F^A$ is also slightly changed by $\alpha_W$. However, the change in the magnitude of the resultant air force $F^A$ is the dominant factor.

The invention claimed is:

1. A control device for aircraft for reducing the turbulence and gust influences on the flying characteristics, comprising:
   a sideslip angle sensor for determining the instantaneous sideslip angle ($\beta$);
   a bank angle sensor for determining the instantaneous bank angle ($\Phi$); and
   controller for generating an additional incidence angle drive signal for control surfaces on said aircraft which generate an air force as a function of the instantaneous bank angle ($\Phi$) and sideslip angle ($\beta$), said additional incidence angle drive signal being provided to be added to a main drive signal for the control surfaces, wherein the control device determines the drive signal as a function of a component ($\alpha_{Wf}$) of the wind incidence, caused by a vertical air mass movement, on the plane of symmetry of the aircraft, using the formula:

$$\alpha_{Wf} = \cos(\phi)\left[f\left(\frac{\dot{H}}{V}\right) - \theta + \cos(\phi)\left(\alpha + \frac{q \cdot r_{A\phi A}}{V}\right) + \sin(\phi)\left(\beta - \frac{r \cdot r_{A_a S}}{V}\right)\right]$$

where $\Phi$ is the bank angle, $\dot{H}$ is the vertical velocity of the aircraft, V is the airspeed of the aircraft with respect to the surrounding air, $\theta$ is the longitudinal attitude angle of the aircraft, $\alpha$ is the angle of attack, q is the pitch rate of the aircraft, $r_{AoA}$ is the distance between the incidence angle sensor and the center of gravity of the aircraft, r is the yaw rate and $r_{AoS}$ is the distance between the sideslip angle sensor and the center of gravity, and $$f\left(\frac{\dot{H}}{V}\right)$$

is a function of the ratio of the vertical velocity $\dot{H}$ to the airspeed V.

2. The control device as claimed in claim 1, wherein the control device is designed to determine the drive signal using the function $$f\left(\frac{\dot{H}}{V}\right) \text{ equal to } \frac{\dot{H}}{V} \text{ or } \arcsin\left(\frac{\dot{H}}{V}\right).$$

3. The control device as recited in claim 1 wherein said additional incidence angle drive signal generated is for a wing.

4. The control device as recited in claim 1 wherein said additional incidence angle drive signal generated is for a tailplane.

5. A method for reducing the turbulence and gust influences on the flying characteristics of aircraft, comprising the steps of:
   determining the instantaneous sideslip angle ($\beta$);
   determining the instantaneous bank angle ($\Phi$); and
   generating an additional incidence angle ($\alpha_{Wf}$) control signal for control surfaces of said aircraft which generate an air force as a function of the control signal, said additional incidence angle drive signal being provided to be added to a main drive signal for the control surfaces, said control signal being a function of the instantaneous bank angle ($\Phi$) and sideslip angle ($\beta$), said main drive signal together with the superimposed control signal controlling the control surfaces wherein said generating step uses the formula:

$$\alpha_{Wf} = \cos(\phi)\left[f\left(\frac{\dot{H}}{V}\right) - \theta + \cos(\phi)\left(\alpha + \frac{q \cdot r_{A\phi A}}{V}\right) + \sin(\phi)\left(\beta - \frac{r \cdot r_{A_a S}}{V}\right)\right]$$

where $\Phi$ is the bank angle, $\dot{H}$ is the vertical velocity of the aircraft, V is the airspeed of the aircraft with respect to the surrounding air, $\theta$ is the longitudinal attitude angle of the aircraft, $\alpha$ is the angle of attack, q is the pitch rate of the aircraft, $r_{AoA}$ is the distance between the incidence angle sensor and the center of gravity of the aircraft, r is the yaw rate and $r_{AoS}$ is the distance between the sideslip angle sensor and the center of gravity, and $$f\left(\frac{\dot{H}}{V}\right)$$

is a function of the ratio of the vertical velocity $\dot{H}$ to the airspeed V.

6. The method as claimed in claim 5, wherein the function is $$f\left(\frac{\dot{H}}{V}\right) \text{ equal to } \frac{\dot{H}}{V} \text{ or } \arcsin\left(\frac{\dot{H}}{V}\right).$$

* * * * *